United States Patent Office 3,473,852
Patented Oct. 21, 1969

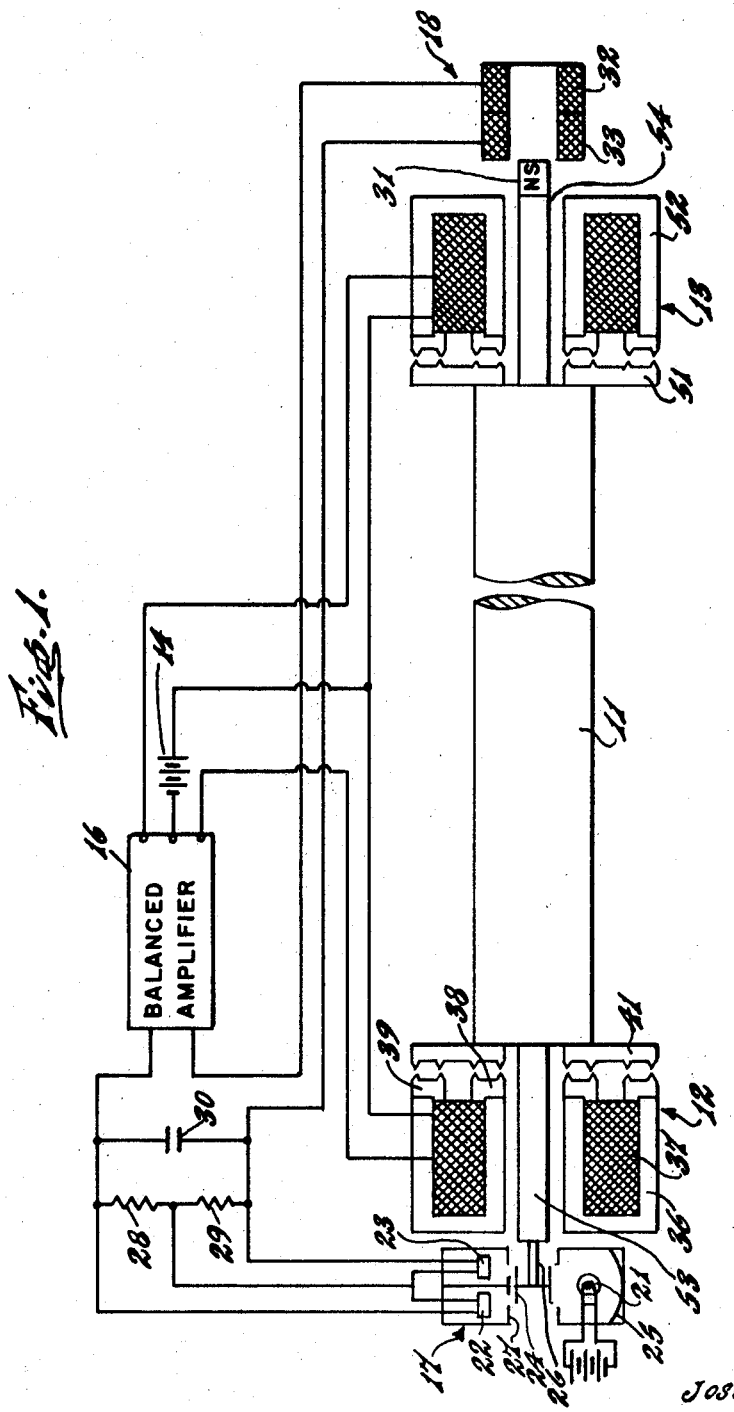

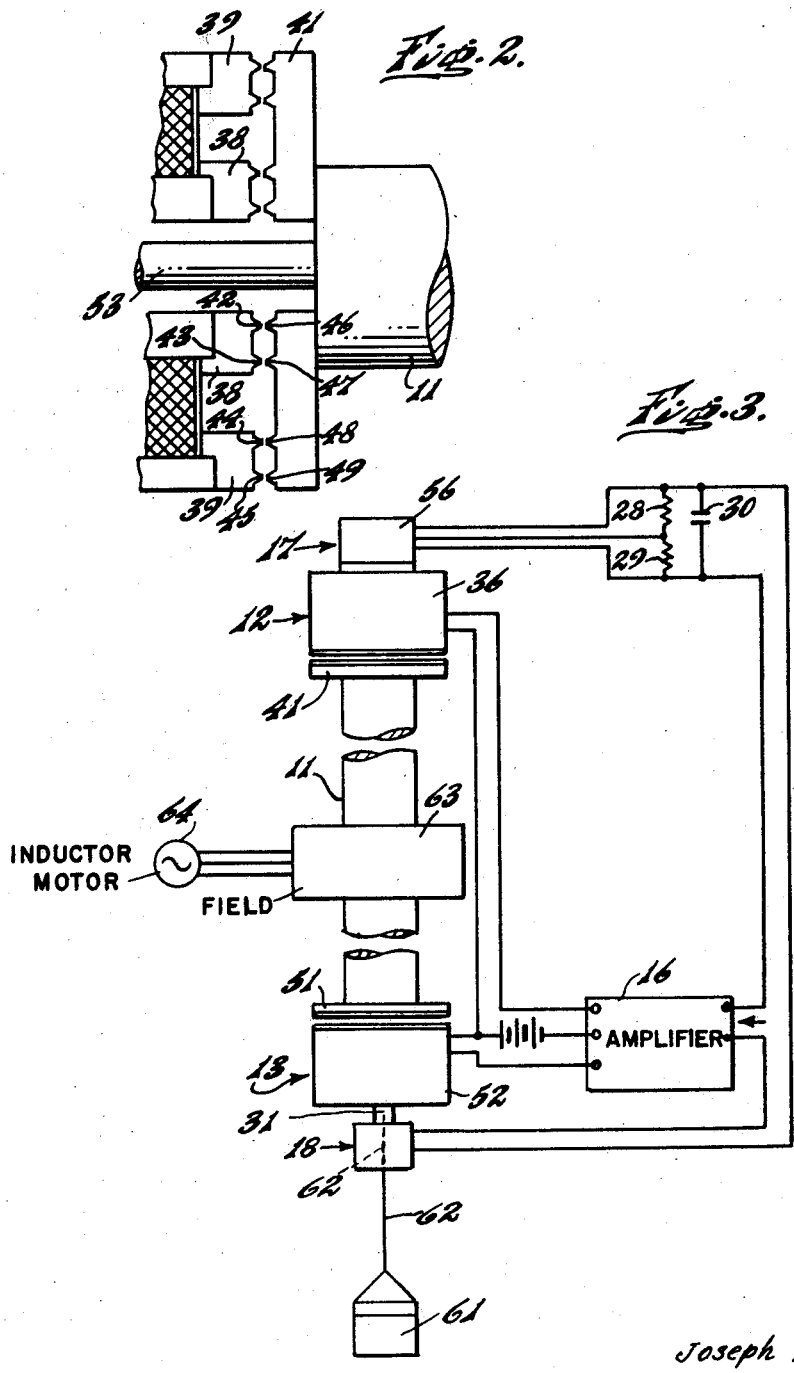

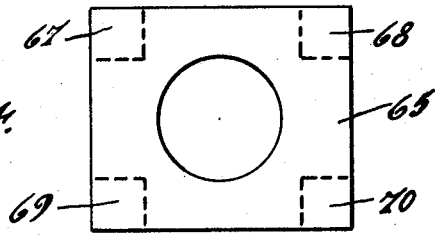
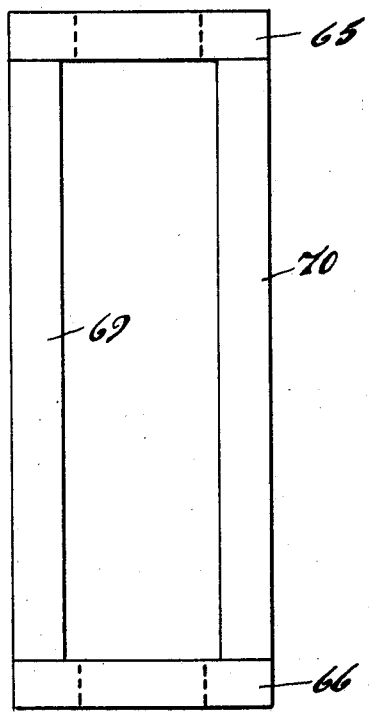

3,473,852
MAGNETIC SUSPENSION APPARATUS
Joseph Lyman, Northport, N.Y., assignor to Cambridge Thermionic Corporation, Cambridge, Mass., a corporation of Massachusetts
Filed Dec. 18, 1967, Ser. No. 691,284
Int. Cl. F16c 39/06
U.S. Cl. 308—10　　　　　　　　　　　　　　7 Claims

ABSTRACT OF THE DISCLOSURE

Magnetic suspension apparatus for suspending a movable body between a pair of electromagnets exerting radial centering forces and opposed axial pulling forces, the magnets being variably energized according to the relative rate of movement and the displacement of the body. Each electromagnet is provided with projections on its pole face and an adjacent armature having related projections in proximity to the projections of the electromagnet. Through variable energization by sensitive control means primarily responsive to rate of longitudinal motion, the electromagnets with these projections provide stable positional control of the body not only along but also transverse the axis.

BACKGROUND OF THE INVENTION

The present invention relates to suspension systems, and is particularly concerned with suspension apparatus wherein substantial centering forces are achieved with stability, economy of supplied power, economy of apparatus, and compactness.

Prior systems for magnetic suspension of an object with respect to three degrees of freedom in translation without any fluid flotation means have relied upon the use of positional and rate pickoff means and force applying means for each of a plurality of different axes. Such a system is described in my application Ser. No. 522,726 filed Jan. 24, 1966. In accordance therewith, an elongated body may be suspended in a desired position by five pairs of mutually opposed force appliers. One such pair of force appliers may be disposed to exert mutually opposed pulling forces along the longitudinal axis of the body. Near each end of the body, two more pairs of mutually opposed force appliers are arranged, one pair exerting its mutually opposed forces along a first axis transverse said longitudinal axis, and the other pair exerting its mutually opposed forces along a second axis transverse said longitudinal axis and perpendicular to said first transverse said longitudinal axis and perpendicular to said transverse axis. Such a system requires multiple pickoffs and multiple control amplifiers. Each of the five pairs of force appliers contributes to the overall power consumption and heat dissipation of the system. Such an arrangement yields flexibility as to the relative strengths of the longitudinal axis forces and the forces exerted along the several transverse axes. However, the cost, space requirements, power requirements and heat dissipation requirements are dependent in part on the number of axes for which independent pickoffs, amplifiers and force appliers are provided.

SUMMARY OF THE INVENTION

An object of the present invention is to provide an efficient, compact suspension system achieving stable positional control of a suspended body with economy of power and accompanying minimization of heat dissipation problems.

A further object of the present invention is to provide a simple magnetic suspension system wherein an object is suspended and controlled as to plural degrees of translatory freedom without the necessity of pickoff and force applying means operating with respect to different axes thereof.

Another object of this invention is to provide a stable, adequately damped magnetic suspension affording complete support and positional control of a movable object without the necessity of multiple-axis pickoffs and force applying means.

In accordance with the present invention, these objects are met by use of a pair of electromagnetic force appliers between which a movable body is suspended. The force appliers are controlled by stable amplifier means mainly responsive to velocity of motion of the body and secondarily responsive to the displacement of the body from a predetermined position between the force appliers. The pole faces and armatures of the electromagnetic force appliers are configured with confronting circular projections or ridges to produce substantial radial force components in response to, and for overcoming, slight departures from coaxial alignment between the magnets and their armatures.

BRIEF DESCRIPTION OF THE DRAWINGS

Illustrative embodiments of the invention are described hereinafter and are shown in the accompanying drawings, wherein:

FIG. 1 shows an embodiment of the invention, portions being shown in cross-section; FIG. 2 is an enlarged cross-sectional view of a portion of the structure of FIG. 1; FIG. 3 is a centrifuge embodying the present invention, the centrifuge elements being shown in elevation; and FIGS. 4 and 5 are plan and elevation views, respectively, of one form of frame structure for supporting the elements shown in the preceding figures.

DESCRIPTION OF THE PREFERRED EMBODIMENTS

FIG. 1 illustrates an embodiment of the present invention. A rigid body 11 such as a cylinder is suspended between electromagnetic force appliers 12 and 13. These force appliers are energized by a source 14 and amplifier 16. The input signal to amplifier 16 comprises a displacement signal component produced by displacement pickoff 17 and a rate signal component produced by rate generator means 18.

In the embodiment of the invention illustrated in FIG. 1, the force appliers 12 and 13 are energized by direct current, the intensity of energization being differentially controllable by the output of the amplifier 16. Amplifier 16 is a high stability amplifier preferably comprising matched transistors so arranged that their temperatures remain substantially in balance.

In order to realize the desired operating characteristics, the axial force applied by each force applier is substantially greater than the weight of the suspended body 11 in the gravitational or accelerational environment in which it is to be suspended. Body 11 is illustrated as a figure of revolution about its longitudinal axis, for example a cylinder. It may take the form of a gyroscope rotor, or may be vertically arranged as a rotary mass from which a centrifuge chamber is to depend. As another example, the suspended body 11 may serve as an inertial body whose position is sensed photoelectrically, for example, with suitable markings on its surface.

In the illustrated embodiment, displacement of the body 11 from the intended position along its axis is detected photoelectrically by the pickoff 17 comprising light source 21, reflector 25 and differential photoelectric pickup devices 22 and 23. A cylindrical differential shutter 24 or light piston is fixed to an extension 53, 26 of the body 11. Displacement of the body to the left from its neutral position reduces the opening through which photoelectric device 22 receives light from source 21 while increasing the opening through which photoelectric device 23 receives light, resulting in a net output voltage across capacitor 30 having the polarity determined by photoelectric device 23. Conversely, a displacement to the right from the desired neutral position produces the opposite condition with the output of photoelectric device 22 predominating and determining the polarity of the net output signal. The shutter 24 cooperates with apertures in the adjacent wall 27 to provide the desired sensitivity, with appreciable changes of light levels at the photoelectric devices 22 and 23 for very small displacements of the body 11.

The outputs of photoelectric devices 22 and 23 are connected to resistors 28 and 29 across which is connected capacitor 30. The photoelectric device outputs produce one polarity at the junction of resistors 28 and 29 and the other polarity at the opposite terminals of said resistors.

The rate generator means 18 comprises a permanent magnet 31 fixed to one end of body 11 and arranged to cooperate with coils 32 and 33 as an electrodynamic signal source. When there is no axial component of movement of body 11, the strength of the magnetic flux from magnet 31 encircling turns of coil 32 and coil 33 remains constant, with no output voltage being produced. When body 11 is moving in the direction from left to right, the increasing magnetic flux linkage with the turns of coils 32 and 33 results in an output voltage of a first polarity proportional to the rate of movement of body 11 in said direction. Conversely, movement of the body 11 in the opposite direction causes the magnetic flux linking the turns of coils 32 and 33 to decrease, the output voltage being in the opposite polarity to that which results from movement of the body toward the right.

The output of the rate generator 18 is connected in series with the displacement pickoff output circuit, the series combination of these outputs being connected to the input terminals of the amplifier 16. These outputs are so polarized that when the body 11 is displaced in one direction from the neutral position and moving in the same direction so that the displacement is increasing, the output of the displacement pickoff is in series aiding with the rate generator output. Conversely, when the body 11 is moving toward its neutral position, the output of the displacement pickoff is in series opposition to the rate generator output.

Each of the force appliers 12 and 13 comprises an electromagnet so constructed and arranged as to exert on the body 11 a substantial force parallel to the axis thereof when said body is aligned with the axes of the stators of said magnets, and to exert a substantial force component transverse the axis of body 11 when it is slightly displaced from the position of coincidence of its axis with the axes of the stators of said magnets.

The stator of electromagnetic force applier 12 comprises a reentrant cup 36 of permeable material and a winding 37 inserted therein. The inner cylindrical portion of cup 36 is provided with an annular pole face portion 38 and the outer cylindrical portion is provided with a larger-diameter annular pole face portion 39. An annular armature plate 41 of permeable material is fixed to body 11 and arranged to cooperate with pole face portions 38 and 39 in defining annular air gaps in the path of the magnetic flux produced by current through coil 37.

At least one concentric circular projection or ridge is provided on each of the annular pole face portions 38 and 39 and corresponding concentric circular projections or ridges are provided on the confronting face of armature 41. In the illustrated embodiment, the inner pole face portion 38 is provided with two circular projections 42 and 43 and the outer annular face portion 39 is provided with two circular projections 44 and 45, as shown more clearly in FIG. 2. Matching concentric circular projections or ridges 46, 47, 48 and 49 are provided on the armature 41.

Force applier 13 is similarly constructed, with a reentrant cup 52 and inner and outer pole face portions having circular projections or ridges thereon, and with an armature 51 having circular projections or ridges normally directly opposite to those on the pole face portions.

The cylindrical openings along the axes of cups 36 and 52 provide clearance for the oppositely extending portions 53 and 54 of the body 11 on which are carried the displacement pickoff mask 24 on shaft extension 26 and the permanent magnet 31 of the rate signal generator means 18, respectively.

The reentrant cups 36 and 52 enclosing the stator units of the force appliers 12 and 13 are fixedly supported in axial alignment in any well-known manner, as are also the enclosure 56 (see FIG. 3) of the displacement pickoff 17 and the stator coils 32 and 33 of the rate generator means 18. If desired, the system as shown in FIG. 1 may be horizontally disposed. If it is operated in the earth's gravitational field, the force appliers 12 and 13 are then required to exert vertical force components equal to the weight of the suspended mass. Under the influence of gravity, the body 11 is displaced slightly downward, the displacement of body 11 and the armatures 41 and 51 fixed thereto being such that the projections or ridges in the confronting faces in each force applier are sufficiently displaced from coaxial alignment to produce the necessary vertical force components. But for the highly stable amplifier system for varying the strength of the magnetic fields of force appliers 12 and 13 in response to displacement and rate of axial movement of the suspended body, the magnetically suspended system would be unstable and one of the armatures would be caused to contact its related electromagnet pole faces and be held in contact therewith. However, upon meeting the requirements now to be discussed, stable suspension of the body 11 is achieved, free from contact with any stator element.

The system must be so constructed and arranged as to minimize and preferably avoid disadvantageous intercoupling between the rate generator and the displacement pickoff, and further, to minimize and preferably avoid disadvantageous intercoupling between either of these sensing devices and the electromagnetic force appliers. Along with these requirements, it is advisable to keep the sensitivity of the rate generator means high in relation to the displacement sensitivity. This factor, together with high stability of the amplifier 16, results in stable positional control of the body 11, substantially free from hunting.

In the system shown in the drawings, disadvantageous interactions are minimized in view of the types and positions of the pickoff devices. The inclusion in the rate generator means the split winding arrangement consisting of windings 32 and 33 minimizes the responsiveness to stray magnetic fields. Furthermore, the nearer electromagnetic force applier 13 has its coil substantially shielded from the rate generator 18 by its reentrant cup 52. Its air gaps between the armature 51 and the inner and outer pole faces are sufficiently far from the rate generator 18 to avoid appreciable magnetic feedback between the amplifier output system including force applier 13 and the amplifier input system including the rate generator 18.

Inasmuch as the displacement pickoff 17 relies upon a variably shuttered light system and is substantially free from generation of magnetic fields and equally free from responsiveness thereto, no difficulty is encountered with intercoupling between pickoff 17 and any other part of the suspension apparatus.

For convenience, the displacement pickoff may be positioned at the opposite end of body 11 from the rate generator 18, as shown in FIG. 1. However, it will be appreciated that in view of the difference between the principles of operation of the displacement pickoff 17 and the rate generator 18, these devices may be arranged adjacent each other at one end of the body 11.

FIG. 3 illustrates the use of apparatus like that shown in FIG. 1 in a centrifuge. In the apparatus there illustrated, the centrifuge chamber 61 is suspended by a strand 62 such as a wire or a plastic thread from one end of the electromagnetically suspended body 11. Inasmuch as the strand 62 is shown extending to the rate generator 18, it is to be fastened centrally to the end of the magnet in said generator so as to extend axially downward therefrom. Alternatively, the strand 62 may extend through an axial bore to a point of attachment nearer the center of mass of body 11.

For imparting high-speed rotation to body 11 and the centrifuge chamber 61 depending therefrom, a rotating induction field may be produced around the body 11, causing said body to function as the rotor of a motor by virtue of the currents induced therein interacting with the rotating field. For this purpose, a motor field unit 63 surrounding body 11 is energized by a suitable alternating current source, e.g. a polyphase source 64. If desired, the body 11 may be provided with low-resistance current paths in any desired configuration in the vicinity of field unit 63 for enhanced motor efficiency. Alternatively, a motor rotor unit may be fixed to the body 11 to form a part thereof.

Where the suspended body 11 is to be accelerated up to a high rotational speed, as in the case of a centrifuge, it is important to provide a rigid, massive supporting frame preferably symmetrical about the axis of body 11 for the support of the reentrant cups 36 and 52 of the electromagnetic force appliers, the displacement pickoff 17, the rate generator 18 and the motor field unit 63. One example of such a frame is shown in plan and elevation views in FIGS. 4 and 5. Heavy rigid upper and lower end plates 65 and 66 are spaced apart in fixed relation to each other by a set of four columns 67, 68, 69 and 70 which may be of square, round or hexagonal cross-section, for example. The end plates 65 and 66 are arranged to receive the respective magnet cups. The displacement and rate pickup devices may be supported from the end plates, as by suitable spacer studs and bolts. The motor field unit, if any, may be attached to the columns intermediate the end plates 65 and 66.

While square end plates are shown in FIGS. 4 and 5, round or polygonal end plates may be used with a different number of columns than the 4 columns illustrated. Another suitable form of support may comprise a rigid cylindrical wall with the end plates fixed to, or near, the ends thereof. Either of the above-described frames is also suitable for use with the suspended mass, force appliers and pickup devices when used for other applications, such as an inertial mass device, with or without rotating field drive means.

In operation, the suspension system as shown and described herein is capable of suspending the body 11 in the horizontal or vertical position or any other desired orientation. It maintains the body 11 suspended between the force appliers 12 and 13 with or without the presence of the earth's gravitational field or other force field of comparable strength. When the body 11 moves toward one force applying unit the field energization of the opposite unit is so intensified as to bring it back to the desired position. The strong rate component in the control of the force appliers prevents any substantial hunting.

Transverse movement of the body 11 causes reduction of the registration of the projections on the radially displaced armature or armatures with the projections on the adjacent inner and outer magnet pole faces. This so distorts the magnetic field flux pattern between the projections as to provide an increased radial component of restoring forces at that force applying unit while momentarily decreasing the axial force component it exerts on body 11. The resultant movement of body 11 toward the opposite force applying unit (where the radial component of displacement is less) causes the pickoffs to respond, the force at the first force applying unit being thereby augmented for enhanced radial and axial restoring force components. The resulting overall action is that of a very stable suspension, substantially free from hunting.

Obviously, many other modifications and variations of the invention as hereinbefore set forth may be made without departing from the spirit and scope thereof.

What is claimed is:

1. Magnetic suspension apparatus comprising
a movable object having a longitudinal axis,
first and second magnetic attraction means at the opposite ends of said movable object, each of said first and second means comprising an electromagnet and an armature both coaxial with said longitudinal axis and having mutually opposed pole faces with circular flux-concentrating projections thereon, the circular electromagnet pole face projections extending in close proximity to the armature pole face projections,
means including amplifier means responsive to input control signals for differentially energizing the electromagnets at the opposite ends of said movable object,
and means primarily responsive to the component of velocity of said movable object parallel to said longitudinal axis and responsive also to the displacement of said movable object from a predetermined position along said axis for supplying a control signal to said amplifier.

2. Magnetic suspension apparatus comprising
first and second electromagnetic force-applying units spaced apart along an axis,
a movable body suspended between said first and second force-applying units and having armatures thereon spaced apart along an axis of said body, each force-applying unit comprising a plurality of magnetic flux concentrating pole face rings and armature rings extending into close proximity with each other,
means including an amplifier for differentially energizing said first and second electromagnetic force-applying units in accordance with an amplifier input signal,
and means primarily responsive to the rate of change of position of said movable body and responsive also to displacement thereof along said axis for supplying input signal to said amplifier.

3. Magnetic suspension apparatus comprising
first and second electromagnetic force-applying units spaced apart along an axis,
a movable body supported by magnetic suspension between said first and second force-applying units,
each of said first and second force-applying units comprising an electromagnet stator portion and armature means on said movable body for cooperating with said stator portion,
each of said first and second force-applying units including mutually adjacent projections on the armature means and the stator portion for concentrating the magnetic flux therebetween and providing enhanced radial stability,
means for producing a signal varying according to displacement of said body from a desired position between said first and second force-applying units,
means for producing a signal varying according to velocity of motion of said body from one of said force-applying units toward the other,
and means responsive to the signals produced by both said signal producing means for energizing said first and second force-applying means differentially in accordance therewith.

4. Magnetic suspension apparatus as defined in claim 3, wherein said means for producing a signal varying according to displacement comprises a pair of photoelectric devices and means movable with said body for differentially varying the light incident on said photoelectric devices.

5. Magnetic suspension apparatus as defined in claim 3, wherein said means for producing a signal varying according to velocity comprises a symmetrically arranged pair of coils and a magnet movable with said body and situated in the vicinity of at least one of said coils.

6. Magnetic suspension apparatus as defined in claim 3, further including motor stator means for causing said body to rotate about its axis, and support means holding in fixed positional relations both said force-applying units, said means for producing a signal varying according to displacement, said means for producing a signal varying according to velocity and said motor stator means.

7. Magnetic suspension apparatus as defined in claim 6, further including a centrifuge chamber depending from said body for rotation thereby.

References Cited

UNITED STATES PATENTS

| 2,733,857 | 2/1956 | Beams | 308—10 |
| 2,797,912 | 7/1957 | Trostler | 308—10 |
| 2,856,238 | 10/1958 | Dacus | 308—10 |
| 3,215,901 | 11/1965 | Carniol | 308—10 |
| 3,226,016 | 12/1965 | Couper. | |
| 3,243,238 | 3/1966 | Lyman | 308—10 |
| 3,307,884 | 3/1967 | Dunlap | 308—10 |

MILTON O. HIRSHFIELD, Primary Examiner

R. SKUDY, Assistant Examiner